United States Patent
Ebrahimi Afrouzi

(10) Patent No.: US 9,714,033 B2
(45) Date of Patent: Jul. 25, 2017

(54) VEHICLE COLLISION AVOIDANCE SYSTEM

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto, ON (CA)

( * ) Notice: Subject to any disclaimer, the term of this patent is extended or adjusted under 35 U.S.C. 154(b) by 0 days.

(21) Appl. No.: 15/017,901

(22) Filed: Feb. 8, 2016

(65) Prior Publication Data
US 2016/0229396 A1 Aug. 11, 2016

Related U.S. Application Data

(60) Provisional application No. 62/113,486, filed on Feb. 8, 2015.

(51) Int. Cl.
| | |
|---|---|
| B60W 30/09 | (2012.01) |
| B60W 10/04 | (2006.01) |
| B60W 10/20 | (2006.01) |
| B60W 10/30 | (2006.01) |
| B60W 50/14 | (2012.01) |
| B60W 50/16 | (2012.01) |
| B60W 10/184 | (2012.01) |
| G01S 13/93 | (2006.01) |

(52) U.S. Cl.
CPC ............ *B60W 30/09* (2013.01); *B60W 10/04* (2013.01); *B60W 10/184* (2013.01); *B60W 10/20* (2013.01); *B60W 50/14* (2013.01); *B60W 50/16* (2013.01); *B60W 2050/143* (2013.01); *B60W 2050/146* (2013.01); *B60W 2420/52* (2013.01); *B60W 2420/54* (2013.01); *B60W 2420/62* (2013.01); *B60W 2422/95* (2013.01); *B60W 2550/10* (2013.01); *B60W 2550/30* (2013.01); *B60W 2720/10* (2013.01); *G01S 2013/9364* (2013.01); *G01S 2013/9367* (2013.01); *G01S 2013/9375* (2013.01); *G01S 2013/9378* (2013.01); *G01S 2013/9385* (2013.01)

(58) Field of Classification Search
CPC ...... B60W 30/09; B60W 10/04; B60W 10/20; B60W 10/30; B60W 2720/10; B60W 2550/30; B60W 2710/20; B60W 2710/30; B60T 2201/022
USPC ...................... 701/301, 41, 70; 340/435, 903
See application file for complete search history.

(56) References Cited

U.S. PATENT DOCUMENTS

| | | | | |
|---|---|---|---|---|
| 5,173,881 A * | 12/1992 | Sindle | .................... | B60Q 9/006 367/101 |
| 6,204,798 B1 * | 3/2001 | Fleming, III | ........... | G01S 7/022 342/195 |
| 2004/0088079 A1 * | 5/2004 | Lavarec | ................ | G01S 17/026 700/258 |
| 2004/0181338 A1 * | 9/2004 | Dobler | ................... | G08G 1/166 701/301 |
| 2008/0055114 A1 * | 3/2008 | Kim | ......................... | B60R 1/00 340/937 |

(Continued)

Primary Examiner — Marthe Marc-Coleman

(57) ABSTRACT

A vehicle collision avoidance system that utilizes signal emitters and receivers positioned around the periphery of vehicles to detect nearby vehicles. Upon detection of a nearby vehicle, the system may execute any of a variety of predefined responses based on the distance from the local vehicle to the detected nearby vehicle.

8 Claims, 5 Drawing Sheets

(56) References Cited

U.S. PATENT DOCUMENTS

| | | | |
|---|---|---|---|
| 2012/0154135 A1* | 6/2012 | Tronnier | B60W 30/18163 340/435 |
| 2014/0009307 A1* | 1/2014 | Bowers | G08G 1/166 340/901 |
| 2014/0012492 A1* | 1/2014 | Bowers | G08G 1/16 701/301 |
| 2015/0083921 A1* | 3/2015 | Ooyabu | G01S 7/481 250/341.8 |
| 2016/0039411 A1* | 2/2016 | Park | G01S 13/87 701/70 |

* cited by examiner

| DISTANCE TO LATERALLY DETECTED OBSTACLE (centimeters) | ACTION |
| --- | --- |
| 60 + | No action |
| 40-59 | Check opposite side receivers, if clear, adjust steering position 2 degrees in opposite direction for 2 seconds |
| 20-39 | Check opposite side receivers, if clear, adjust steering position 5 degrees in opposite direction for 1.5 seconds; audible alert |
| 0-19 | Check opposite side receivers, if clear, adjust steering position 8 degrees in opposite direction for 1 second; reduce speed by 5 mph; audible alert; visual alert; haptic alert |

VEHICLE COLLISION AVOIDANCE SYSTEM

CROSS-REFERENCE TO RELATED APPLICATIONS

This application claims the benefit of provisional patent application Ser. No. 62/113,486, filed Feb. 8, 2015 by the first named inventor.

FIELD OF INVENTION

The present invention relates to a vehicle collision avoidance method.

BACKGROUND OF INVENTION

The following is a tabulation of some prior art that presently appears relevant:

U.S. Patent Documents

| Patent Number | Kind Code | Issue Date | Patentee |
| --- | --- | --- | --- |
| 5,684,474 | A | 1997 Nov. 4 | Gilon; Shmuel, Zelig; Robert |
| 7,289,019 | B1 | 2007 Oct. 30 | Jon Kertes |
| 6,359,552 | B1 | 2002 Mar. 19 | UT AUTOMATIVE DEARBONRN, INC., Lear Automotive Dearborn Inc |
| 7,991,551 | B2 | 2011 Aug. 2 | Ford Global Technologies LLC |
| 8,941,510 | B2 | 2015 Jan. 27 | BCS Business Consulting Services Pte Ltd |
| 8,948,929 | B2 | 2015 Feb. 3 | KT Corp |
| 9,046,374 | B2 | 2015 Jun. 2 | AUTOCONNECT HOLDINGS LLC |
| 6,791,471 | B2 | 2004 Sep. 14 | HEWLETT PACKARD ENTERPRISE DEVELOPMENT LP |

Various factors can lead to a human operated vehicle becoming dangerously close to or colliding with other vehicles. Both external factors and driver mistakes or inabilities can lead to dangerous driving situations. For example, coughing, sneezing, or other distractions can cause a driver's momentary inability to react to driving situations safely. Likewise, strong winds or other external factors may contribute to a user's inability to safely control a vehicle. A need exists for a fallback method to avoid collisions in the event of driver inability.

SUMMARY OF INVENTION

It is a goal of the present invention to provide a method for vehicles to automatically detect nearby vehicles and take action when necessary to avoid collisions.

The present invention achieves the aforementioned goal through a system of signal emitters and signal receivers installed around the periphery of vehicles. Signals are emitted in predetermined fields and are received by signal receiver units on nearby vehicles. The signals may be any of: laser light beams, infrared light beams, radio waves, or ultrasound waves. In the preferred embodiment, a plurality of emitters and receivers are installed around the periphery of vehicles so that they may detect and be detected by other vehicles approaching from any direction. When a vehicle detects signals emitted from a nearby vehicle, distance measuring means are triggered to determine the distance from the local vehicle to the first obstacle at the point where the approaching vehicle was detected. The system can then carry out any of a variety of predefined actions based on the distance to the obstacle. Various responses may be programmed, such as countersteering, notifying the driver, accelerating, decelerating, or any other predetermined action or combination of actions. The responsive actions taken could be selected based on the location of the receivers that detected the approaching vehicle.

BRIEF DESCRIPTION OF DRAWINGS

FIG. 2 illustrates a table of possible distance thresholds and corresponding actions embodying features of the present invention.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Generally, the present invention relates to a vehicle collision avoidance system.

According to the present invention, signal emitters are positioned around the periphery of vehicles to emit signals in predetermined trajectories. Signal receivers are also positioned around the periphery of vehicles to detect signals emitted from other nearby vehicles. In the preferred embodiment, signal emitters and receivers are installed on all sides of a vehicle (left, right, front and rear) so that vehicles can be detected from any of the sides. When a vehicle approaches another vehicle, the emitted signals from each vehicle are received by the receivers on the vehicles. Upon detecting one or more signals of another vehicle, the system is triggered to determine the distance to the first obstacle at the location of the received signal or signals. Any of laser rangefinders, ultrasonic rangefinders, or radar may be used to determine the distance from the local vehicle to the first obstacle. (In most cases, the distance to the first obstacle will be the distance to the detected approaching vehicle, however it is possible for another obstacle to exist between the local vehicle and the detected vehicle, so the distance determined is defined generally, to include this possibility.) If the distance is greater than a predetermined threshold, the system may be configured to take no action. If the distance is less than a predetermined threshold, the system may be configured to execute any of a variety of actions. Any number of thresholds and corresponding actions may be defined.

In some embodiments, corresponding actions may include alerting the driver of the vehicle. Alerts may comprise any of: an auditory alert, a haptic alert, such as vibration of the steering wheel, a visual alert, such as a flashing light, or any other type of alert or combination of alerts.

In some embodiments, corresponding actions may include countersteering. In the preferred embodiment, countersteering is only executed after performing a number of additional steps to verify that there is enough free space around the vehicle to safely countersteer. These additional steps will be discussed in more detail later.

Figure 1:
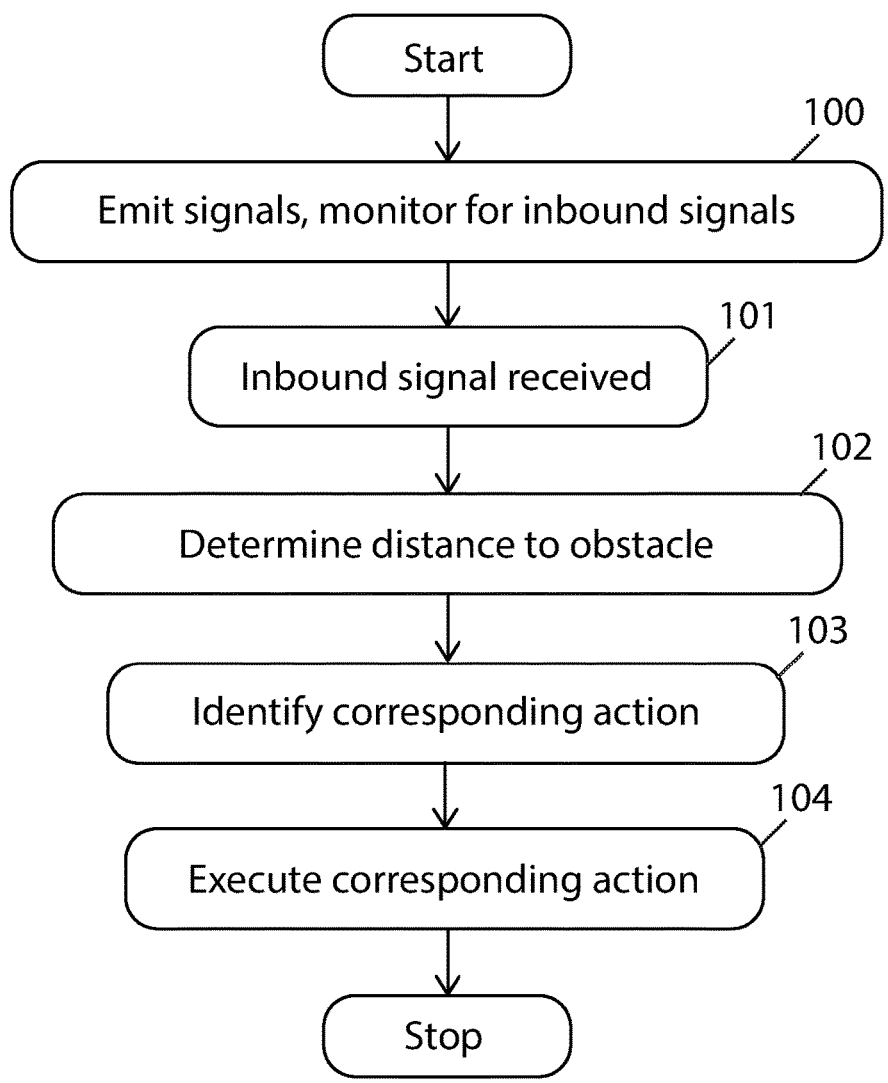
FIG. 1 illustrates the process of a vehicle detecting an approaching vehicle and reacting embodying features of the present invention.

Referring to FIG. 1, the process of a vehicle detecting an approaching vehicle and reacting is illustrated. In a first step 100, signal emitters positioned around the periphery of the local vehicle emit outbound signals and signal receivers positioned around the periphery of the local vehicle monitor for inbound signals. Signal emitters are positioned such that the emitted signals are emitted within a predetermined field. In a like manner, signal receivers are positioned such that they may receive incoming signals from a predetermined range. As long as no inbound signals are detected, the process continues emitting signals and monitoring for inbound signals. If inbound signals are detected by one or more signal receivers in a next step 101, the method proceeds to a step 102 to determine the distance from the local vehicle to a first obstacle substantially at or near the location of the receiver or receivers that detected the inbound signals in step 101. In a next step 103, the method determines what action to take based on the determined distance and a predetermined threshold or series of thresholds and corresponding actions. In a next step 104, the system executes the corresponding action.

Referring to FIG. 2, an example of a table 200 of possible distance thresholds and corresponding actions is illustrated. The specific thresholds and corresponding actions are not limited; the example shown is meant to be illustrative rather than restrictive. Thresholds and corresponding actions may be configured as desired during manufacture. In the preferred embodiment, sets of actions are defined based on the location of the receivers that detected the approaching vehicle. The table 200 defines actions for vehicles detected laterally adjacent to the local vehicle. That is, the corresponding actions will be taken when receivers on either the left or right side of the vehicle detect an approaching vehicle. Other sets of distance thresholds and corresponding actions may be defined for the anterior receivers and the rear receivers as desired.

Figure 3:
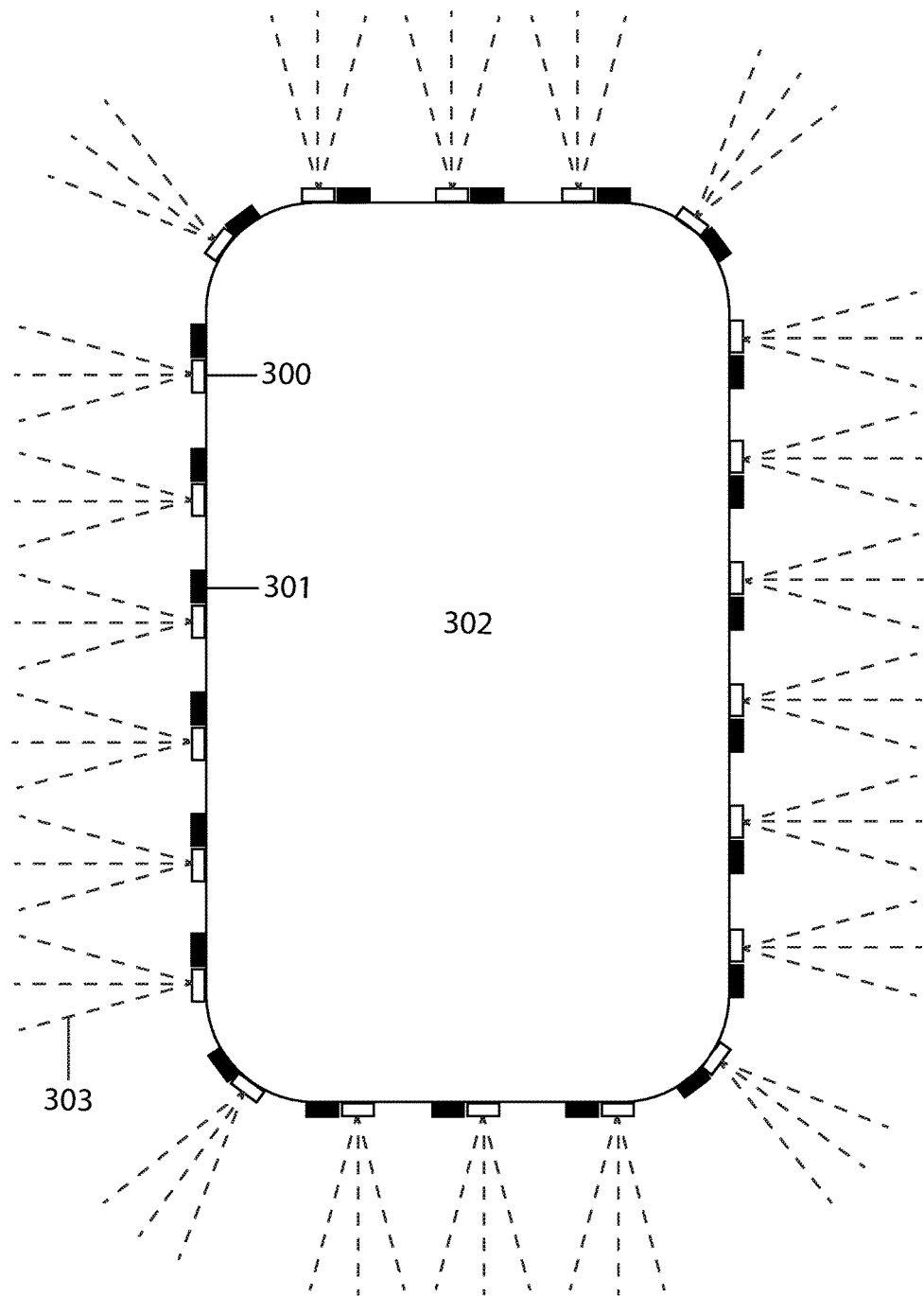
FIG. 3 illustrates a vehicle with signal emitters and signal receivers positioned around its periphery embodying features of the present invention.

Referring to FIG. 3, an overhead view of a vehicle with the proposed collision avoidance system is illustrated. Signal emitters 300 and signal receivers 301 are positioned around the periphery of the vehicle 302. The signal emitters 300 emit signals 303 in a predetermined range. In a like manner, the signal receivers 301 are positioned such that they may receive incoming signals from a predetermined range.

Figure 4:
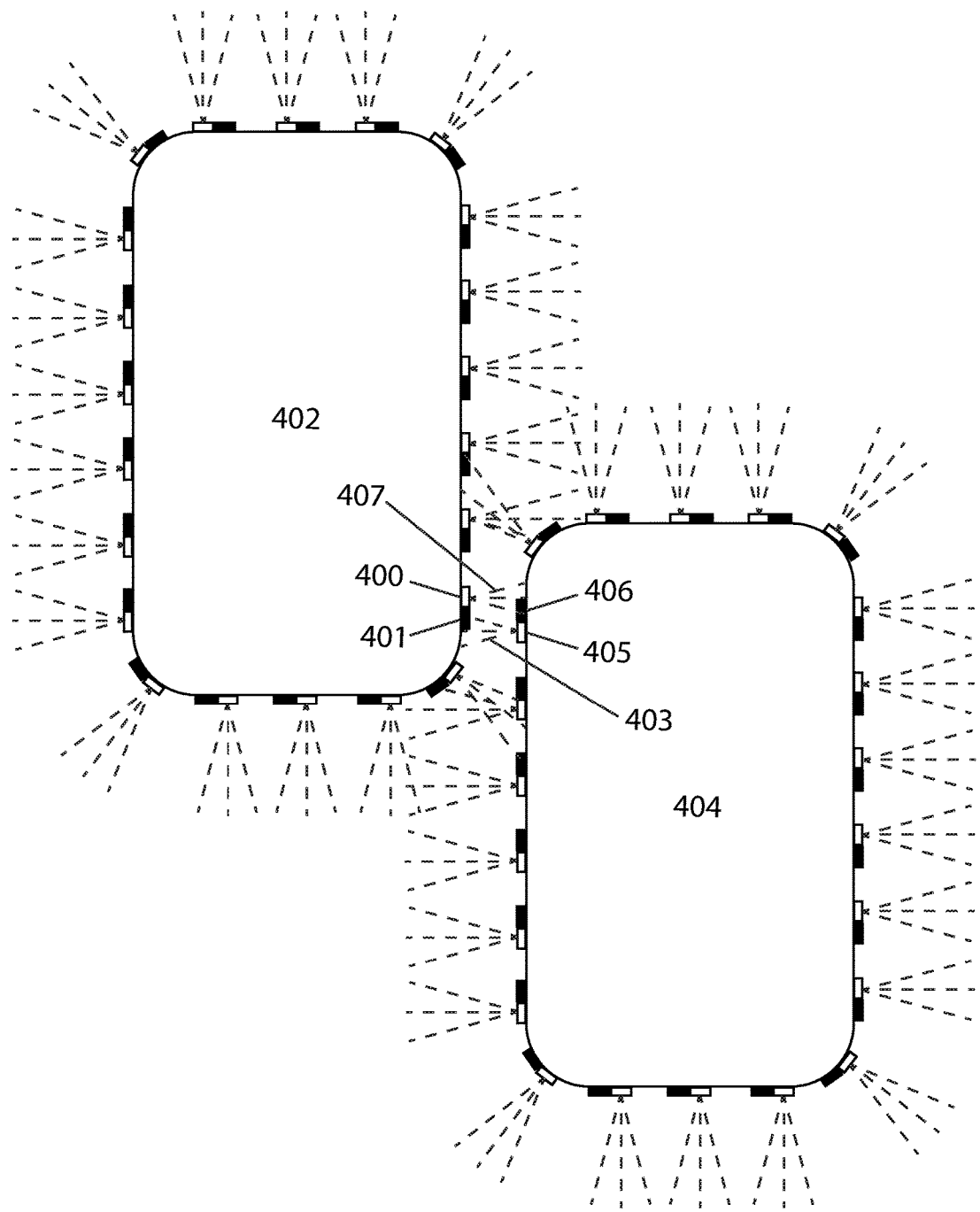
FIG. 4 illustrates two vehicles detecting one another by receiving the emitted signals of the approaching vehicle embodying features of the present invention.

Referring to FIG. 4, an overhead view of two vehicles utilizing the proposed collision avoidance system to detect each other is illustrated. The vehicles 402 and 404 are so close to each other that receiver 401 positioned on vehicle 402 detects the signals 403 from emitter 405 on positioned vehicle 404 and receiver 406 positioned on vehicle 404 detects the signals 407 from emitter 400 positioned on vehicle 402. (Other receivers may also detect signals, however, only one set of signal exchanges are labeled and described in order to not obscure the drawing details.) As described above, upon detecting a nearby vehicle, each vehicle is caused to use distance-measuring means to determine the distance to the detected vehicle and execute the corresponding predetermined actions, if any.

Figure 5:
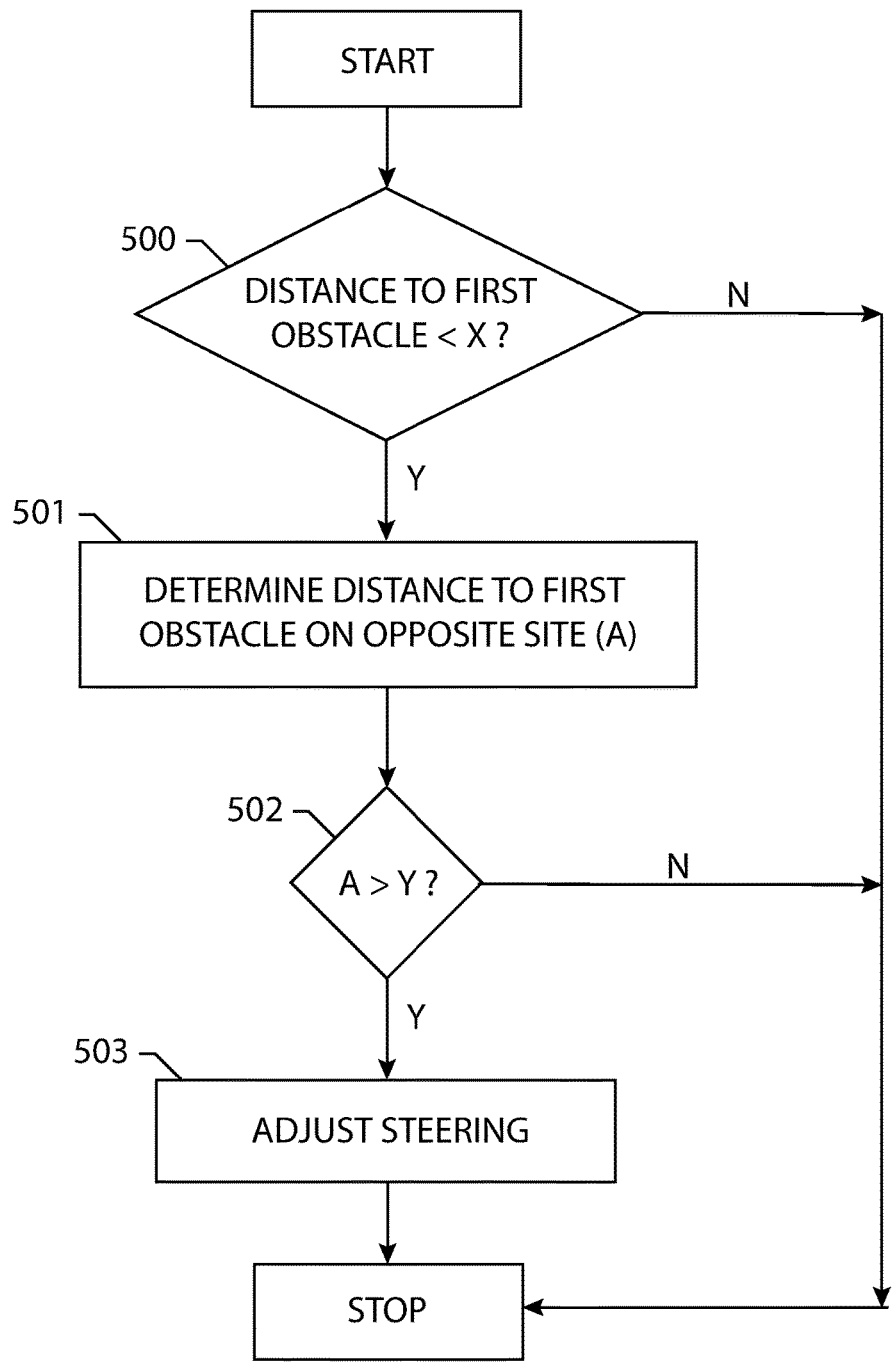
FIG. 5 illustrates the process of countersteering embodying features of the present invention.

Referring to FIG. 5, the steps of the countersteering process of are illustrated. In a first step 500, the system determines whether the distance from the local vehicle to the first obstacle at or near the location of the receiver or receivers that detected the approaching vehicle is less than a predetermined threshold. If the distance is less than the predetermined threshold, the method proceeds to a next step 501 in which the system determines the distance to the first obstacle on the opposite side of the vehicle. In a next step 502, the system determines whether the distance to the first obstacle on the opposite side of the vehicle is greater than a predetermined threshold. If the distance is greater than the predetermined threshold, the method proceeds to the next step 503, to adjust the steering position of the local vehicle. In the preferred embodiment, steering is adjusted by a number of degrees based on the distance from the local vehicle to the detected approaching vehicle, the side on which the approaching vehicle was detected, and the speed of the local vehicle. In the preferred embodiment, after a predetermined amount of time, the steering position is returned to its original position.

We claim:

1. A method for a subject vehicle to avoid collisions with a different vehicle comprising:
    emitting signals from a plurality of signal emitters positioned around the periphery of a subject vehicle such that signals are emitted within a predetermined range;
    receiving one or more inbound signals emitted from a different vehicle with one or more signal receivers positioned around the periphery of the subject vehicle;
    determining a distance from the subject vehicle to the different vehicle upon receipt of the one or more inbound signals at a location of a signal receiver that received the one or more inbound signals; and,
    executing any of a variety of predefined collision avoidance actions, separately or in combination, based on the determined distance or distances from the subject vehicle to the different vehicle.

2. The method of claim 1 in which said signals are any of: laser light beams, infrared light beams, radio waves, and ultrasound waves.

3. The method of claim 1 in which said predefined collision avoidance actions include any of: countersteering, applying a haptic alert, emitting a sound alert, displaying a visual alert, reducing speed, and increasing speed.

4. The method of claim 3 in which countersteering comprises:
    in a first step, determining whether said distance from the subject vehicle to the different vehicle is less than a predetermined threshold;
    in a second step, if said distance is less than said predetermined threshold, determining a second distance to a nearest obstacle on a side of the subject vehicle opposite of a side on which said different vehicle was detected; and,
    in a third step, if said second distance is greater than a predetermined threshold, adjusting the steering position of the subject vehicle a predetermined amount, in a direction opposite of a side on which said inbound signal or signals were received, for a predetermined length of time.

5. A system for avoiding vehicular collisions comprising:
a plurality of signal emitters positioned around the periphery of a subject vehicle such that signals may be emitted within a predetermined range;
a plurality of signal receivers positioned around the periphery of the subject vehicle such that inbound signals emitted from a different vehicle within a predetermined field may be received;
and,
one or more predefined collision avoidance actions corresponding to one or more vehicle to vehicle distance thresholds;
whereby, upon receipt of one or more inbound signals from a different vehicle, the subject vehicle:
determines the distance from the subject vehicle to a different vehicle at a location of a signal receiver that received one or more inbound signals; and
executes the one or more collision avoidance actions corresponding to a distance from the subject vehicle to the different vehicle.

6. The system of claim 5 in which said signals are any of: laser light beams, infrared light beams, radio waves, and ultrasound waves.

7. The system of claim 5 in which said predefined collision avoidance actions include any of: countersteering, applying a haptic alert, emitting a sound alert, displaying a visual alert, reducing speed, and increasing speed.

8. The system of claim 7 in which countersteering comprises:
in a first step, determining whether the distance from the subject vehicle to the different vehicle is less than a predetermined threshold;
in a second step, if said distance is less than said predetermined threshold, determining a second distance to a nearest obstacle on the side of the subject vehicle opposite of the side on which the different vehicle was detected; and,
in a third step, if said second distance is greater than a predetermined threshold, adjusting the steering position of the subject vehicle a predetermined amount, in a direction opposite of the side on which said inbound signal or signals were received, for a predetermined length of time.

* * * * *